UNITED STATES PATENT OFFICE.

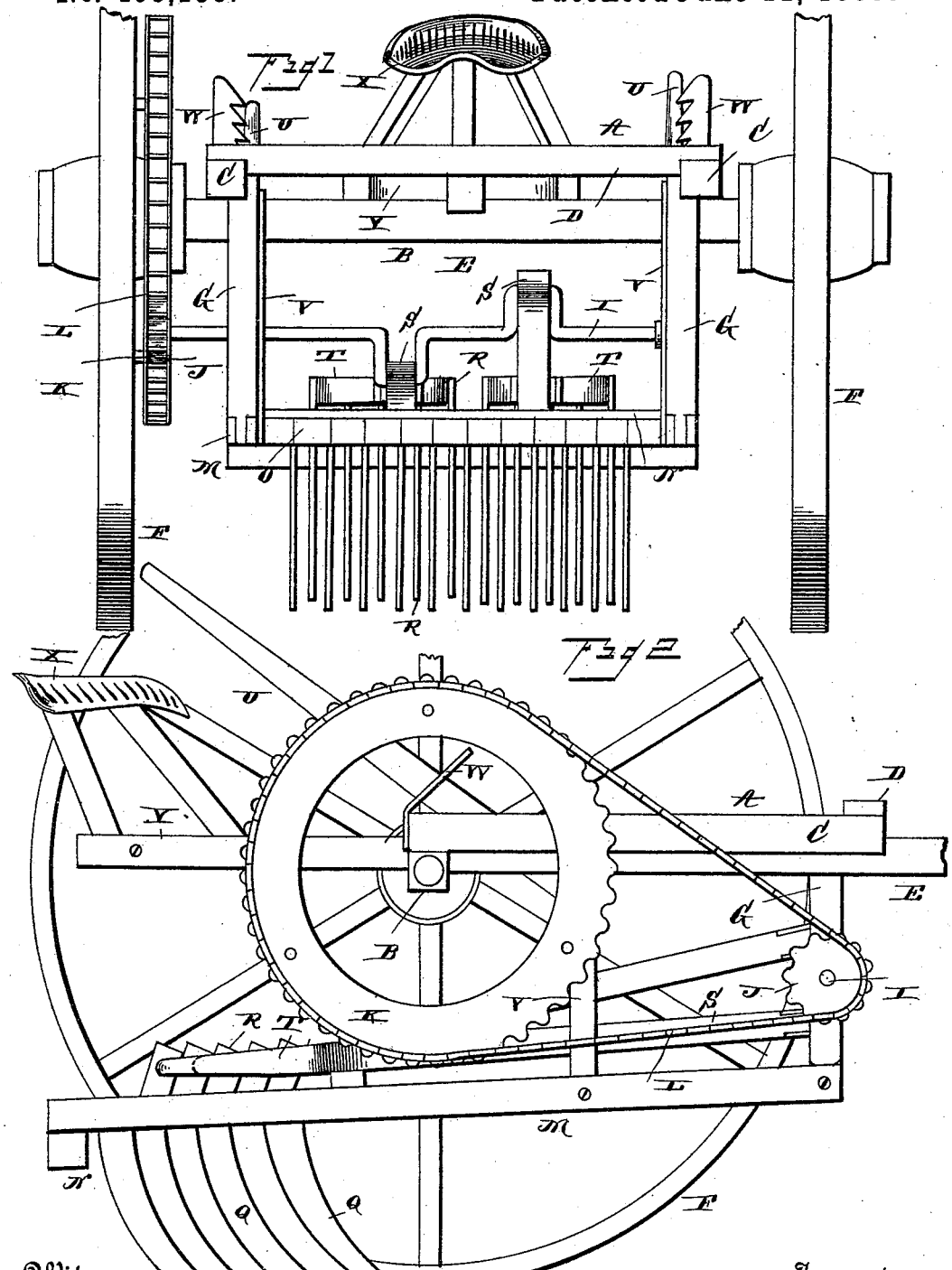

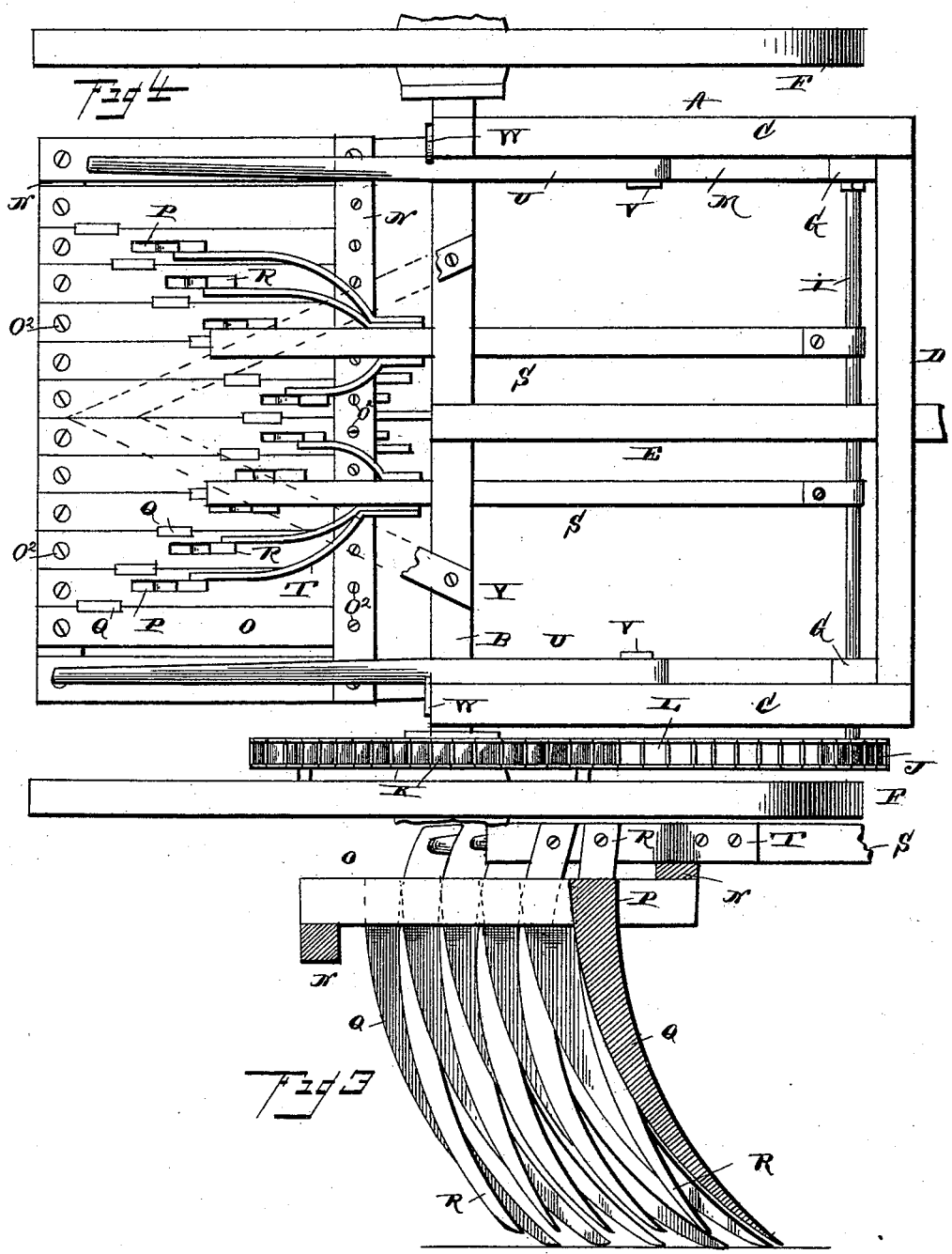

JOHN HENRY FINKLE, OF APPLETON, WISCONSIN, ASSIGNOR OF ONE-HALF TO ELIAS B. CLARK, OF SAME PLACE.

POTATO-DIGGER.

SPECIFICATION forming part of Letters Patent No. 405,155, dated June 11, 1889.

Application filed January 26, 1889. Serial No. 297,612. (No model.)

*To all whom it may concern:*

Be it known that I, JOHN HENRY FINKLE, a citizen of the United States, residing at Appleton, in the county of Outagamie and State of Wisconsin, have invented new and useful Improvements in Potato-Diggers, of which the following is a specification.

My invention relates to improvements in potato-diggers; and it consists in certain novel features hereinafter described and claimed.

In the accompanying drawings, Figure 1 is a front elevation of a potato-digger constructed in accordance with my invention. Fig. 2 is a side view with the near wheel removed. Fig. 3 is a similar view showing the cleaners in a different position, and Fig. 4 is a plan view.

Referring to the drawings by letter, A designates the main frame, consisting of the axle B, the side bars C, secured to and projecting forward from the axle, the cross-bar D, connecting the front ends of the said side bars, and the tongue E, secured to the axle and the cross-bar and projecting forward therefrom. The carrying and driving wheels F are mounted on the ends of the axle, as clearly shown. To the side bars C, at the front ends of the same, I secure the hangers G, in which is journaled a multiple crank-shaft I, having a sprocket-pinion J on one end, the said sprocket-pinion being geared to a sprocket-wheel K, secured concentrically to one of the driving and supporting wheels by means of a sprocket-chain L, as shown. To the lower ends of the hangers I pivotally secure the front ends of the side bars M of the supplemental frame.

N N designate cross-bars which are secured between the side bars M, at the rear ends thereof and near the center of the same, and support a series of bars or plates O, which are secured detachably to said cross-bars by means of screws O² and provided with longitudinal slots P. The plows or knives Q are secured to these plates or bars P and depend therefrom, and are arranged in two series which diverge toward the rear end of the machine, so that as they unearth the potatoes they will throw the same to one side. Within the slots P of the plates or bars O, I pivot the pickers or cleaners R, each one of which is arranged between two of the knives or shovels and is adapted to be oscillated between the same, so as to prevent them clogging as the machine is drawn over the field. The upper ends of these knives or pickers are pivoted to the rear ends of pitmen S, extending from the crank-shaft I, and to lateral arms T, secured to said pitmen. By this arrangement as the machine is drawn over the ground the crank-shaft is rotated and the cleaners consequently oscillated, as will be readily understood.

U U designate levers which are pivoted to the side bars C of the main frame, near the rear ends of the same, and extend rearward therefrom. The front ends of these levers are connected by links V with the side bars M of the supplemental frame. At the rear ends of the side bars C, I secure the vertical rack-plates W, which are engaged by the rear portions of the levers U, so that the said levers will be locked against vertical movements.

My device is intended to be attached to a sulky-cultivator and drawn over the ground in rear of the same; but, if so desired, it may be used independently of the cultivator, and for this purpose I have provided it with a seat X, supported by a frame Y, secured to and projecting rearwardly from the axle.

In practice the machine is drawn over the ground and the knives or plows will cut thereinto and unearth the potatoes. As the machine is drawn along, the cleaners will be oscillated between the plows, so as to prevent potatoes lodging thereon, and also prevent the plows becoming clogged by the vines. After the potatoes have been dug up, the levers are operated to raise the supplemental frame, so that the plows will be above the ground, after which the machine can be readily drawn to another field or to the barn.

My device is composed of few parts and is strong and durable. It is efficient in its operation and requires little or no attention from the driver.

Having thus described my invention, what I claim, and desire to secure by Letters Patent, is—

1. The combination of the main frame, the supplemental frame arranged below the main frame and supported thereby, the plows secured to the supplemental frame, the cleaners pivotally mounted on the supplemental frame and each adapted to vibrate between two adjacent plows, and mechanism for vibrating the cleaners, as set forth.

2. The combination of the main frame, the hangers G, depending therefrom, the supplemental frame pivoted at its front end to said hangers, the plows and cleaners carried by the supplemental frame, the rack-plates W on the main frame, the levers fulcrumed on the main frame and engaging said rack-plates, and the links connecting said levers with the supplemental frame, as set forth.

3. The combination of the main frame, the hangers secured thereto, the supplemental frame pivoted to said hangers, the longitudinally-slotted bars at the rear end of the supplemental frame, the plows secured to said bars, the cleaners pivoted within the slots of said bars, the crank-shaft journaled in the hangers, the pitmen having their front ends mounted on said shaft and their rear ends connected to the cleaners, mechanism for rotating the crank-shaft, and mechanism for raising and lowering the supplemental frame, as set forth.

In testimony that I claim the foregoing as my own I have hereto affixed my signature in presence of two witnesses.

JOHN HENRY FINKLE.

Witnesses:
G. R. DOWNER,
R. J. MARSHALL.